(12) United States Patent
LaVen (10) Patent No.: US 7,887,958 B2
(45) Date of Patent: Feb. 15, 2011

(54) HYDROGEN-PRODUCING FUEL CELL SYSTEMS WITH LOAD-RESPONSIVE FEEDSTOCK DELIVERY SYSTEMS

(75) Inventor: Arne LaVen, Bend, OR (US)

(73) Assignee: Idatech, LLC, Bend, OR (US)

( * ) Notice: Subject to any disclaimer, the term of this patent is extended or adjusted under 35 U.S.C. 154(b) by 713 days.

(21) Appl. No.: 11/747,091

(22) Filed: May 10, 2007

(65) Prior Publication Data

US 2007/0264546 A1 Nov. 15, 2007

Related U.S. Application Data

(60) Provisional application No. 60/800,654, filed on May 15, 2006.

(51) Int. Cl.
*H01M 8/06* (2006.01)
(52) U.S. Cl. .................. 429/408; 429/428; 429/430
(58) Field of Classification Search .................. 429/34, 429/408
See application file for complete search history.

(56) References Cited

U.S. PATENT DOCUMENTS

| | | |
|---|---|---|
| 2,824,620 A | 2/1958 | De Rosset |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,522,019 A | 7/1970 | Buswell et al. |
| 3,655,448 A | 4/1972 | Setzer |
| 3,765,946 A | 10/1973 | Werner et al. |
| 3,857,735 A | 12/1974 | Louis et al. |
| 3,877,989 A | 4/1975 | Waldman et al. |
| 3,920,416 A | 11/1975 | Houseman |
| 3,955,941 A | 5/1976 | Houseman et al. |
| 3,982,910 A | 9/1976 | Houseman et al. |
| 4,000,003 A | 12/1976 | Baker et al. |

(Continued)

FOREIGN PATENT DOCUMENTS

EP 0752731 B1 1/1997

(Continued)

OTHER PUBLICATIONS

English-language abstract of German language PCT Patent Application Serial No. WO 97/43796, 1997.

(Continued)

*Primary Examiner*—Ula C Ruddock
*Assistant Examiner*—Patricia Davis
(74) *Attorney, Agent, or Firm*—Dascenzo Intellectual Property Law, P.C.

(57) ABSTRACT

Hydrogen-producing fuel cell systems with load-responsive feedstock delivery systems, and methods for regulating the delivery of feedstock to the hydrogen-producing region of a fuel cell system. The fuel cell systems include a control system that is adapted to monitor and selectively regulate the rate at which the feedstock is delivered to a hydrogen-producing region of a hydrogen generation assembly. The control systems, and corresponding methods, include feed-forward and feedback control portions that cooperatively regulate the rate at which the feed stream is delivered to the hydrogen generation assembly responsive at least in part, if not completely, to the fuel cell stack's demand for hydrogen gas and the rate at which the produced hydrogen gas is consumed by the fuel cell stack.

10 Claims, 3 Drawing Sheets

U.S. PATENT DOCUMENTS

| | | |
|---|---|---|
| 4,003,343 A | 1/1977 | Lee |
| 4,098,959 A | 7/1978 | Fanciullo |
| 4,098,960 A | 7/1978 | Gagnon |
| 4,175,165 A | 11/1979 | Adlhart |
| 4,214,969 A | 7/1980 | Lawrance |
| 4,310,605 A | 1/1982 | Early et al. |
| 4,349,613 A | 9/1982 | Winsel |
| 4,351,405 A | 9/1982 | Fields et al. |
| 4,377,445 A | 3/1983 | Grimes |
| 4,387,434 A | 6/1983 | Moncrief, Jr. et al. |
| 4,390,602 A | 6/1983 | Struthers |
| 4,444,158 A | 4/1984 | Yoon |
| 4,468,235 A | 8/1984 | Hill |
| 4,472,176 A | 9/1984 | Rubin |
| 4,473,622 A | 9/1984 | Chludzinski et al. |
| 4,533,607 A | 8/1985 | Sederquist |
| 4,553,981 A | 11/1985 | Fuderer |
| 4,567,857 A | 2/1986 | Houseman et al. |
| 4,642,273 A | 2/1987 | Sasaki |
| 4,657,828 A | 4/1987 | Tajima |
| 4,781,241 A | 11/1988 | Misage et al. |
| 4,788,004 A | 11/1988 | Pinto et al. |
| 4,820,594 A | 4/1989 | Sugita et al. |
| 4,839,246 A | 6/1989 | Takabayashi |
| 4,839,574 A | 6/1989 | Takabayashi |
| 4,883,724 A | 11/1989 | Yamamoto |
| 4,904,548 A | 2/1990 | Tajima |
| 4,946,667 A | 8/1990 | Beshty |
| 4,981,676 A | 1/1991 | Minet et al. |
| 4,988,283 A | 1/1991 | Nagasawa et al. |
| 5,006,846 A | 4/1991 | Granville et al. |
| 5,030,661 A | 7/1991 | Lywood |
| 5,139,894 A | 8/1992 | Mizuno et al. |
| 5,154,986 A | 10/1992 | Takechi et al. |
| 5,200,278 A | 4/1993 | Watkins |
| 5,229,222 A | 7/1993 | Tsutsumi et al. |
| 5,334,463 A | 8/1994 | Tajima et al. |
| 5,354,547 A | 10/1994 | Rao et al. |
| 5,366,818 A | 11/1994 | Wilkinson et al. |
| 5,366,821 A | 11/1994 | Merritt et al. |
| 5,401,589 A | 3/1995 | Palmer et al. |
| 5,417,051 A | 5/1995 | Ankersmit et al. |
| RE35,002 E | 7/1995 | Matsubara et al. |
| 5,432,710 A | 7/1995 | Ishimaru et al. |
| 5,462,815 A | 10/1995 | Horiuchi |
| 5,478,662 A | 12/1995 | Strasser |
| 5,509,942 A | 4/1996 | Dodge |
| 5,527,632 A | 6/1996 | Gardner |
| 5,624,768 A | 4/1997 | Tanokura |
| 5,631,532 A | 5/1997 | Azuma et al. |
| 5,631,820 A | 5/1997 | Donnelly et al. |
| 5,637,414 A | 6/1997 | Inoue et al. |
| 5,658,681 A | 8/1997 | Sato et al. |
| 5,677,073 A | 10/1997 | Kawatsu |
| 5,705,916 A | 1/1998 | Rudbeck et al. |
| 5,712,052 A | 1/1998 | Kawatsu |
| 5,714,276 A | 2/1998 | Okamoto |
| 5,763,113 A | 6/1998 | Meltser et al. |
| 5,771,476 A | 6/1998 | Mufford et al. |
| 5,780,179 A | 7/1998 | Okamoto |
| 5,795,666 A | 8/1998 | Johnssen |
| 5,798,186 A | 8/1998 | Fletcher et al. |
| 5,821,185 A | 10/1998 | White et al. |
| 5,846,669 A | 12/1998 | Smotkin et al. |
| 5,861,137 A | 1/1999 | Edlund |
| RE36,148 E | 3/1999 | Strasser |
| 5,897,766 A | 4/1999 | Kawatsu |
| 5,897,970 A | 4/1999 | Isomura et al. |
| 5,927,416 A | 7/1999 | del Re et al. |
| 5,929,538 A | 7/1999 | O'Sullivan et al. |
| 5,932,181 A | 8/1999 | Kim et al. |
| 5,964,309 A | 10/1999 | Kimura et al. |
| 5,985,474 A | 11/1999 | Chen et al. |
| 5,989,739 A | 11/1999 | Zur Megede et al. |
| 5,991,670 A | 11/1999 | Mufford et al. |
| 5,997,594 A | 12/1999 | Edlund et al. |
| 5,998,053 A | 12/1999 | Diethelm |
| 6,001,499 A | 12/1999 | Grot et al. |
| 6,007,931 A | 12/1999 | Fuller et al. |
| 6,013,385 A | 1/2000 | DuBose |
| 6,022,634 A | 2/2000 | Ramunni et al. |
| 6,042,956 A | 3/2000 | Lenel |
| 6,045,772 A | 4/2000 | Szydlowski et al. |
| 6,045,933 A | 4/2000 | Okamoto |
| 6,051,192 A | 4/2000 | Maston et al. |
| 6,054,229 A | 4/2000 | Hsu et al. |
| 6,067,482 A | 5/2000 | Shapiro |
| 6,083,637 A | 7/2000 | Walz et al. |
| 6,084,318 A | 7/2000 | Mardirossian |
| 6,096,449 A | 8/2000 | Fuglevand et al. |
| 6,103,410 A | 8/2000 | Fuller et al. |
| 6,120,923 A | 9/2000 | Van Dine et al. |
| 6,165,633 A | 12/2000 | Negishi |
| 6,171,574 B1 | 1/2001 | Juda et al. |
| 6,183,914 B1 | 2/2001 | Yao et al. |
| 6,214,484 B1 | 4/2001 | Hauer |
| 6,221,117 B1 | 4/2001 | Edlund et al. |
| 6,242,120 B1 | 6/2001 | Herron |
| 6,245,214 B1 | 6/2001 | Rehg et al. |
| 6,319,306 B1 | 11/2001 | Edlund et al. |
| 6,348,278 B1 | 2/2002 | LaPierre et al. |
| 6,376,113 B1 | 4/2002 | Edlund et al. |
| 6,383,670 B1 * | 5/2002 | Edlund et al. ................. 429/20 |
| 6,387,556 B1 | 5/2002 | Fuglevand et al. |
| 6,393,354 B1 * | 5/2002 | Scheffler et al. ............... 701/99 |
| 6,421,593 B1 | 7/2002 | Kempen et al. |
| 6,423,203 B1 | 7/2002 | Faita et al. |
| 6,451,464 B1 | 9/2002 | Edlund et al. |
| 6,458,477 B1 | 10/2002 | Hsu |
| 6,465,118 B1 | 10/2002 | Dickman et al. |
| 6,494,937 B1 | 12/2002 | Edlund et al. |
| 6,495,277 B1 | 12/2002 | Edlund et al. |
| 6,522,955 B1 | 2/2003 | Colborn |
| 6,537,690 B1 | 3/2003 | Karrupaiah et al. |
| 6,562,111 B2 | 5/2003 | Edlund et al. |
| 6,569,227 B2 | 5/2003 | Edlund et al. |
| 6,583,521 B1 | 6/2003 | Lagod et al. |
| 6,602,627 B2 | 8/2003 | Liu et al. |
| 6,703,722 B2 | 3/2004 | Christensen |
| 6,722,533 B2 | 4/2004 | Skillern |
| 6,761,987 B2 | 7/2004 | Marvin et al. |
| 6,764,782 B2 | 7/2004 | Raiser et al. |
| 6,818,336 B2 | 11/2004 | Isom et al. |
| 6,890,672 B2 | 5/2005 | Dickman et al. |
| 6,902,837 B2 | 6/2005 | McCluskey et al. |
| 2001/0049038 A1 | 12/2001 | Dickman et al. |
| 2002/0020623 A1 | 2/2002 | Speranza et al. |
| 2002/0114984 A1 | 8/2002 | Edlund et al. |
| 2002/0127447 A1 | 9/2002 | Edlund et al. |
| 2002/0169523 A1 | 11/2002 | Ross et al. |
| 2002/0175657 A1 | 11/2002 | Leboe |
| 2002/0192516 A1 | 12/2002 | Tajima |
| 2003/0072977 A1 | 4/2003 | Speranza et al. |
| 2003/0113601 A1 | 6/2003 | Edlund et al. |
| 2003/0167690 A1 * | 9/2003 | Edlund et al. ................. 48/61 |
| 2003/0176951 A1 | 9/2003 | DeMarchi et al. |
| 2003/0203253 A1 * | 10/2003 | Clingerman et al. .......... 429/22 |
| 2003/0215677 A1 | 11/2003 | Frost et al. |
| 2004/0053082 A1 | 3/2004 | McCluskey et al. |
| 2004/0175602 A1 * | 9/2004 | Tahara ........................ 429/23 |
| 2004/0229095 A1 | 11/2004 | Pearson |
| 2004/0247961 A1 | 12/2004 | Edlund |
| 2005/0112425 A1 * | 5/2005 | Hsu ............................ 429/21 |
| 2005/0119842 A1 | 6/2005 | Clingerman et al. |

| | | | |
|---|---|---|---|
| 2005/0122653 | A1 | 6/2005 | McCluskey et al. |
| 2005/0260471 | A1* | 11/2005 | Logan et al. ............... 429/23 |
| 2005/0266284 | A1 | 12/2005 | Scharf |
| 2005/0266285 | A1 | 12/2005 | Edlund et al. |
| 2006/0024540 | A1 | 2/2006 | LaVen et al. |
| 2006/0073363 | A1 | 4/2006 | Taniguchi et al. |
| 2007/0042233 | A1 | 2/2007 | Lyman et al. |

FOREIGN PATENT DOCUMENTS

| | | |
|---|---|---|
| EP | 1065741 A2 | 1/2001 |
| JP | 60-30062 | 2/1985 |
| JP | 2-86069 | 3/1990 |
| JP | 4-163860 | 6/1992 |
| JP | 2000067894 | 3/2000 |
| JP | 2002246051 | 8/2002 |
| WO | WO 98/56058 | 12/1998 |
| WO | WO 99/65097 | 12/1999 |
| WO | WO 00/02282 | 1/2000 |
| WO | WO 00/04600 | 1/2000 |

OTHER PUBLICATIONS

English-language abstract of Japanese Patent No. JP 4-163860, 1992.
English-language abstract of Japanese Patent No. 60-30062, 1985.
English-language abstract of Japanese Patent No. 6176779, 1994.
English-language abstract of Japanese Patent No. 7057758, 1995.
English-language abstract of German language PCT Patent Publication No. WO 98/56058, 1998.
English-language abstract of Japanese Patent No. 11116202, 1999.
English-language abstract of Japanese Patent No. 2-168803, 1999.
English-language abstract of Japanese Patent No. 63-236269, 1999.
English-language abstract of German language PCT Patent Application Serial No. WO 00/04600, 2000.
Edlund, David J. and William A. Pledger, "The Practical Use of Metal-Membrane Reactors for Industrial Applications," The 1995 Membrane Technology Reviews, pp. 89-97 (Nov. 1994).
Nadal, M. et al., "Development of a Hybrid Fuel Cell/Battery Powered Electric Vehicle," International Journal of Hydrogen Energy, vol. 21, No. 6, pp. 497-505, Jun. 1, 1996.
Oertel, Michael, et al., "Steam Reforming of Natural Gas with Integrated Hydrogen Separation for Hydrogen Production," Chemical Engineering Techology, vol. 10, pp. 248-255 (1987).
Piwetz et al., "Hydrodesulfurization and Prereforming of Logistic Fuels for Use in Fuel Cell Applications," presented at the 1996 Fuel Cell Seminar held Nov. 17-20, 1996 in Orlando, Florida, pp. 780-783.
Privette et al., "Status of SOFCo SOFC Technology Development," presented at the 1996 Fuel Cell Seminar held Nov. 17-20, 1996 in Orlando, Florida, pp. 206-209.

* cited by examiner

HYDROGEN-PRODUCING FUEL CELL SYSTEMS WITH LOAD-RESPONSIVE FEEDSTOCK DELIVERY SYSTEMS

RELATED APPLICATION

The present application claims priority to similarly entitled U.S. Provisional Patent Application Ser. No. 60/800,654, which was filed on May 15, 2006 and the complete disclosure of which is hereby incorporated by reference.

FIELD OF THE DISCLOSURE

The present disclosure is directed generally to hydrogen-producing fuel cell systems, and more particularly to hydrogen-producing fuel cell systems having feedstock delivery systems that respond to the hydrogen demand of the fuel cell system.

BACKGROUND OF THE DISCLOSURE

A hydrogen generation assembly, or hydrogen-producing fuel processing assembly, is an assembly that converts one or more feedstocks into a product stream containing hydrogen gas as a majority component. The produced hydrogen gas may be used in a variety of applications. One such application is energy production, such as in electrochemical fuel cells. An electrochemical fuel cell is a device that converts a fuel and an oxidant to electricity, a reaction product, and heat. For example, fuel cells may convert hydrogen and oxygen into water and electricity. In such fuel cells, the hydrogen is the fuel, the oxygen is the oxidant, and the water is a reaction product. Fuel cells are typically coupled together to form a fuel cell stack.

A hydrogen-producing fuel cell system is a hydrogen-producing fuel processing system that also includes a fuel cell stack that is adapted to receive hydrogen gas produced by the fuel processing assembly and to generate an electric current therefrom. The hydrogen-producing fuel cell system includes a hydrogen-producing region in which hydrogen gas is produced as a majority reaction product from one or more feedstocks. The composition, flow rate, and properties of the feedstock(s) delivered to the hydrogen-producing region may affect the performance of the hydrogen generation assembly. This, in turn, may affect the performance of the fuel cell stack, the hydrogen-producing fuel cell system, and/or its ability to satisfy an applied load thereto. Accordingly, hydrogen-producing fuel processing assemblies and hydrogen-producing fuel cell systems will typically include various controls for regulating the flow of feedstock to the hydrogen-producing region.

To efficiently produce hydrogen gas, the feedstock(s) for a hydrogen-producing fuel cell system should be delivered under the desired operating conditions, including temperatures and pressures in a predetermined range, to a hydrogen-producing region of the fuel processing assembly. The product hydrogen stream from the hydrogen-producing region may be purified, if needed, and thereafter used as a fuel stream for a fuel cell stack, which produces an electric current from the product hydrogen stream and an oxidant, such as air. This electric current, or power output, from the fuel cell stack may be utilized to satisfy the energy demands of an energy-consuming device.

A consideration with any hydrogen-producing fuel cell system is the time it takes to begin generating a desired electric current from hydrogen gas produced by the fuel cell system after there is a need to begin doing so. In some applications, it may be acceptable to have a period of time in which there is a demand, or desire, to have the fuel cell system produce a power output to satisfy an applied load, but in which the system is not able to produce the desired power output from hydrogen gas produced by the fuel cell system's fuel processing assembly. In other applications, it is not desirable or acceptable to have such a period where the applied load from an energy-consuming device cannot be satisfied by electric current produced from the hydrogen gas being concurrently generated by the hydrogen generation assembly. As an illustrative example, some fuel cell systems are utilized to provide backup, or supplemental power, to an electrical grid or other primary power source. When the primary power source is not able to satisfy the applied load thereto, it is often desirable for the backup and/or supplemental fuel cell system to be able to provide essentially instantaneous power so that the supply of power to the energy-consuming devices is not interrupted, or not noticeably interrupted.

Fuel cells typically can begin generating an electric current within a very short amount of time after hydrogen gas or another suitable fuel and an oxidant, such as air, is delivered thereto. For example, a fuel cell stack may be adapted to produce an electric current within less than a second after the flows of hydrogen gas and air (or other oxidant stream) are delivered to the fuel cells in the fuel cell stack. Inclusive of the time required to initiate the delivery of these streams from a source containing the hydrogen gas and air, the time required to produce the electric current should still be relatively short, such as less than a minute. However, hydrogen-producing fuel cell systems that require the hydrogen gas to first be produced, and perhaps purified, prior to being utilized to generate the desired power output take longer to generate this power output. When the fuel processing assembly is already at a suitable hydrogen-producing temperature, the fuel cell system may be able to produce the desired power output from hydrogen gas generated by the fuel processing assembly within a few minutes, or less. However, when the hydrogen-producing fuel processor of the fuel cell system's fuel processing assembly is not already at or near a desired hydrogen-producing temperature, the required time will be much longer.

Conventionally, several different approaches have been taken to provide hydrogen-producing fuel cell systems that can satisfy an applied load while the associated hydrogen-producing fuel processing assembly is not presently capable of doing so. One approach is to include one or more batteries or other suitable energy storage devices that may be used to satisfy the applied load until the fuel processing assembly can produce sufficient hydrogen gas for the fuel cell system to produce therefrom a sufficient power output to satisfy the applied load. However, the capacity of such a battery or other energy-storage device is limited, and it is therefore necessary for the hydrogen generation assembly to adjust its production rate of hydrogen gas as the demand for this hydrogen gas by the fuel cell stack increases. Similarly, when this demand decreases, it is desirable for the hydrogen generation assembly to reduce the rate at which hydrogen gas is produced. Some hydrogen generation assemblies may include a mechanism for consuming or otherwise utilizing excess hydrogen gas, but the overall efficiency of the assembly is generally reduced when excess hydrogen gas is generated.

DETAILED DESCRIPTION AND BEST MODE OF THE DISCLOSURE

The present disclosure is directed to systems and methods for controlling the rate of feedstock delivery to a hydrogen-producing region of a hydrogen-producing fuel cell system responsive at least in part upon the load, or demand, placed upon the fuel cell system. Typically, this load will be an electrical load, or demand for electric current, although it is within the scope of the present disclosure that the load may be, or include, a thermal demand.

Figure 1:
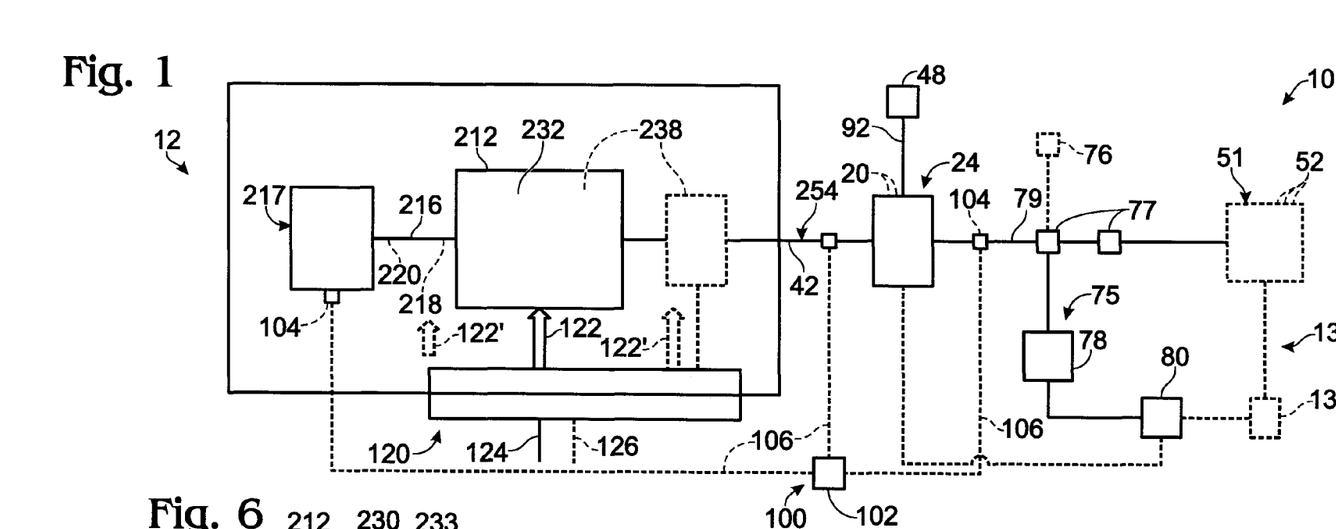
FIG. 1 is a schematic view of an illustrative hydrogen-producing fuel cell system according to the present disclosure.

In FIG. 1, an illustrative example of a hydrogen-generating fuel cell system is schematically illustrated and generally indicated at 10. The hydrogen-producing fuel cell system includes at least one fuel cell stack 24 that is adapted to produce an electric current from hydrogen gas and an oxidant, such as air. The electric current, or electrical output, 79 from the fuel cell stack may be used to satisfy an applied load from an energy-consuming assembly 51, such as may include one or more energy-consuming devices 52.

Also shown in FIG. 1 is an optional energy-storage assembly 75 that also may provide an electric current, or electrical output, that may be utilized to satisfy at least a portion, if not all, of the applied load from the energy-consuming assembly 51. Energy-storage assembly may be designed to provide an electrical output to satisfy some or all of the applied load when the fuel cell stack is not able or available to satisfy some or all the applied load from the energy-consuming assembly. In some embodiments, the energy-consuming assembly may be described as being connected in parallel with the fuel cell stack. Energy-storage assembly 75 may include at least one energy-producing assembly 76 and/or at least one energy-storage device 78. Energy-producing assembly 76 may be any suitable device for producing an electrical output that may be utilized to satisfy at least a portion of the applied load. Illustrative, non-exclusive examples of energy-producing assemblies include another fuel cell stack, a utility grid, an engine-based electrical generator, a wind turbine, a photovoltaic (solar) power source, a hydroelectric power source, and the like. When energy-storage assembly 75 includes an energy-producing assembly 76, the energy-storage assembly may (but is not required to) be referred to an energy supply assembly.

An illustrative, non-exclusive example of a suitable energy-storage device 78 is at least one battery. In some embodiments, the energy-storage device may be a rechargeable storage device, such as may be selectively recharged by a charging assembly, which is schematically illustrated in FIG. 1 at 80. The charging assembly may be powered by any suitable source, including the electrical output from the fuel cell stack and/or a separate power source (including subsequently discussed primary power source 132). Additional illustrative, non-exclusive examples of suitable energy-storage devices that may be used in place of or in combination with one or more batteries include capacitors, ultracapacitors, and supercapacitors. The one or more energy storage devices 78 may be adapted to store at least a portion of the electrical output 79 from the fuel cell stack 24 and/or from another power source, such as another fuel cell system, an electrical utility grid, a solar or wind powered source, the subsequently discussed primary power source (when present in a particular embodiment), etc. Energy-storage device 78 may additionally or alternatively be used to power the fuel cell system during at least startup of the system. The following discussion will describe the fuel cell system as including an energy-storage device 78 in the form of a battery, although as discussed above, this is not required to all embodiments.

As indicated in dashed lines at 77 in FIG. 1, the fuel cell system may, but is not required to, include at least one power management module 77. Power management module 77 includes any suitable type and/or number of devices or structures for conditioning or otherwise regulating the electricity, or electrical output, produced by the fuel cell system, such as for delivery to energy-consuming assembly 51. Module 77 may include such illustrative structure as buck or boost (DC/DC) converters, inverters, power filters, and the like.

As discussed, energy-consuming assembly 51 includes at least one energy-consuming device 52 and is adapted to be selectively powered by fuel cell system 10, such as responsive to a load applied by the energy-consuming device to the fuel cell system. In some embodiments, the energy-consuming assembly may be adapted to be generally, or principally, powered by primary power source 132, with fuel cell system 10 providing power to at least partially or completely satisfy the applied load from the assembly when the primary power source is unable to do so. In such a configuration, the fuel cell system may be configured to supplement and/or back up the primary power source, with primary power source 132 and fuel cell system 10 collectively being referred to as an energy-producing system 130. It is also within the scope of the present disclosure that fuel cell system 10, including the feedstock delivery systems and methods discussed herein, may additionally or alternatively be utilized as a power source for an energy-consuming assembly that is not also configured to be selectively powered by a power source other than the fuel cell system. For the purpose of illustration, however, the following discussion will include additional discussion of an energy-consuming assembly that is adapted to be selectively powered by one or more of the fuel cell system and another power source, which in some embodiments may be referred to as a primary power source.

The energy-consuming assembly is adapted to apply a load, which typically includes at least an electrical load, to energy-producing system 130, with the primary power source being adapted to satisfy that load (i.e., by providing a sufficient power output to the energy-consuming assembly), and with the auxiliary power source being adapted to provide a power output to at least partially, if not completely, satisfy the applied load when the primary power source is unable or otherwise unavailable to do so. These electrical outputs may additionally or alternatively be referred to herein as power outputs. The power and/or electrical outputs may be described as having a current and a voltage. It is within the scope of the present disclosure that the fuel cell system may be adapted to immediately satisfy this applied load upon the primary power source being unable to do so. In other words, it is within the scope of the present disclosure that the fuel cell system is adapted to provide energy-consuming assembly 51 with an uninterruptible power supply, or an uninterrupted supply of power. By this it is meant that the fuel cell system may be configured to provide a power output that satisfies the applied load from energy-consuming assembly 51 in situations where the primary power source is not able or available to satisfy this load, with the fuel cell system being adapted to provide this power output sufficiently fast that the power supply to the energy-consuming assembly is not, or not noticeably, interrupted. By this it is meant that the power output may be provided sufficiently fast that the operation of the energy-consuming assembly is not stopped or otherwise negatively impacted.

It is within the scope of the present disclosure that this load, which may be referred to as an applied load, may additionally or alternatively include a thermal load. The energy-consuming assembly is in electrical communication with the primary power source and fuel cell system 10 via any suitable power conduit. In such a configuration, the primary power source and fuel cell system 10 may be described as having electrical buses in communication with each other and the energy-consuming assembly.

Illustrative, non-exclusive examples of energy-consuming devices 52 that may form all or a portion of the energy-consuming assembly include motor vehicles, recreational vehicles, boats and other sea craft, and any combination of one or more households, residences, commercial offices or buildings, neighborhoods, tools, lights and lighting assemblies, appliances, computers, telecommunications equipment, industrial equipment, signaling and communications equipment, radios, electrically powered components of (or on) boats, recreational vehicles or other vehicles, battery chargers and even the balance-of-plant electrical requirements for the energy-producing system 130.

Hydrogen generation assembly 12 is adapted to produce a product hydrogen stream 254 containing hydrogen gas 42 as a majority component. In many embodiments, stream 254 will contain pure or substantially pure hydrogen gas. Hydrogen generation assembly 12 includes a hydrogen-producing assembly, or fuel processing region, 212 that includes at least one hydrogen-producing region 232 in which hydrogen gas is produced from one or more feedstocks. Hydrogen-producing region 212 may be adapted to produce hydrogen gas as a primary, or majority, reaction product through any suitable chemical process or combination of processes.

Hydrogen generation assembly 12 also includes a feedstock delivery system 217 that is adapted to deliver the one or more feedstocks to the hydrogen-producing region in one or more feed streams 216. Feedstock delivery system 217 may be adapted to deliver the feed stream(s) at a suitable condition and flow rate for producing the desired flow of hydrogen gas therefrom. Feedstock delivery system 217 may receive the feedstocks from any suitable type and number of sources or supplies. Illustrative, non-exclusive examples include a pressurized source and/or a storage tank or reservoir. The feedstock delivery system may include at least one pump or other suitable propulsion mechanism for selectively delivering the feedstock(s) under pressure to the hydrogen generation assembly. When the source is a pressurized source, such as a pressurized tank or external pressurized supply, the feedstock delivery system may regulate the delivery of the feedstock by controlling one or more valves or other suitable flow control devices. When the feedstock is contained in an unpressurized, or low-pressure tank or reservoir, the feedstock delivery system may include a pump or similar propulsion mechanism for drawing the feedstock from the tank or reservoir and pressurizing the stream of feedstock to a suitable pressure for delivery to the hydrogen generation assembly. The feedstock delivery system may optionally include a pressure regulator or similar device for regulating the pressure of the feed stream(s) that are delivered to the hydrogen-producing region.

The hydrogen generation assembly may include a heating assembly 120 that is adapted to heat at least hydrogen-producing region 212, and optionally other regions of the hydrogen generation assembly. For example, the heating assembly may be adapted to heat and/or vaporize (when the feedstock is a liquid prior to being heated by the heating assembly) at least one of the feedstocks in the feed stream(s) prior to, or after, delivery of the feed stream(s) to the hydrogen-producing region. In some embodiments, the heating assembly will heat the hydrogen-producing region to a suitable hydrogen-producing temperature and/or maintain the hydrogen-producing region within a range of suitable hydrogen-producing temperatures. The heating assembly may similarly heat the feed stream(s) to a suitable temperature to assist in maintaining the hydrogen-producing region within a suitable range of hydrogen-producing temperatures. When the hydrogen generation assembly includes a separation and/or purification region, this region may also be heated by the heating assembly. The heating assembly may include any suitable structure for generating heat, such as by including at least one electrical heater, such as an electric resistance heater, and/or by combustion of a fuel. In FIG. 1, heating assembly 120 is schematically illustrated as generating a heated exhaust stream 122 by combustion of a fuel 124. As also illustrated is an optional air stream 126 that is delivered by any suitable air delivery system. In some embodiments, the fuel may have the same composition and/or at least one common feedstock as the feed stream, and in some embodiments, the fuel may include a portion of the mixed gas, or reformate, stream produced in the hydrogen-producing region.

As discussed, the heated exhaust stream from heating assembly 120 may used to heat at least the hydrogen-producing region 232 of the fuel processing assembly. In some embodiments, it may be utilized to heat other components of the fuel processing system, such as is schematically indicated in dashed lines at 122'. Illustrative, non-exclusive examples of other components of the fuel processing assembly that may be heated by the output stream from heating assembly 120 include the feed stream(s) (such as for preheating and/or vaporization) prior to delivery to the fuel processing assembly and/or hydrogen-producing region thereof) and/or a purification region that is positioned external from (and in fluid communication with) the fuel processing assembly.

As also indicated in FIG. 1, hydrogen-generating fuel cell systems 10 according to the present disclosure include a control system 100 that is adapted to regulate the rate at which the one or more feed streams are delivered to the hydrogen-producing region(s) of the hydrogen generation assembly. For the purpose of simplicity, the following discussion will refer to a hydrogen generation assembly that receives a feed stream containing a feedstock. In many embodiments, the feedstock delivery system will be adapted to deliver two or more feedstocks, which may be delivered in the same or different feed streams 216. Accordingly, it is also within the scope of the present disclosure that the control system may be adapted for use with feedstock delivery systems that are adapted to deliver two or more feed streams, each of which may include one or more feedstocks. As discussed in more detail herein, at least one feedstock may include water and/or a carbon-containing feedstock, such as at least one alcohol or hydrocarbon, which as previously mentioned, may be delivered in the same or different feed streams by feedstock delivery system 217 and responsive in part to control inputs from control system 100. Control system 100 may be described and/or implemented as a feedstock delivery control system, in which the control system forms a portion of the feedstock delivery system and/or as a portion of a control system for the fuel processing system, with the control system controlling more than the operation of the feedstock delivery system.

Control system 100 includes a controller, or processor, 102 that is in communication with a sensor assembly 104 that is adapted to measure selected operating parameters of the fuel cell system. Responsive at least in part to these measured parameters, or values, the controller is adapted to monitor and selectively regulate the rate at which the feedstock (and/or the one or more feed streams) is delivered to the hydrogen-producing region of the hydrogen generation assembly. The control system includes feed-forward and feedback control portions that cooperatively regulate the rate at which the feed stream is delivered to the hydrogen generation assembly responsive at least in part, if not completely, to the fuel cell stack's demand for hydrogen gas. As discussed, this demand is responsive to the load being applied to the fuel cell stack, such as by the energy-consuming assembly. The feed-forward and feedback control portions may, but are not required to, also be described or referred to as feed-forward and feedback control mechanisms, feed-forward and feedback control methods, feed-forward and feedback control portions, feed-forward and feedback control algorithms, and/or feed-forward and feedback control means.

The control system, including its controller and sensors or other measurement devices, as well as methods for performing the operations described herein, may be implemented with any suitable structure. The controller may include application-specific or other software, hardware, dedicated computing devices, analog and/or digital components, and the like. The control system may communicate with the various portions of the fuel cell system via any suitable communication linkages 106. The control system may utilize wired or wireless communication protocols. Illustrative, non-exclusive examples of numbers and placements of sensors 104 and control linkages 106 are schematically illustrated in FIG. 1.

The control systems, and corresponding control methods, of the present disclosure not only regulate the rate at which the feed stream is delivered to the hydrogen-producing region, but also trim, or regulate, this rate of delivery responsive to the rate at which the produced hydrogen gas is consumed by the fuel cell stack. Accordingly, the feed-forward control portion and the feedback control portion may be described as cooperatively regulating the rate at which the feedstock(s) (and/or feed stream containing the feedstock(s) are delivered to the hydrogen-producing region of the fuel processing assembly. The feed-forward control portion may be described as proactively adjusting the rate at which the feed stream is delivered to the hydrogen-producing region responsive to the demand for hydrogen gas produced by the hydrogen generation assembly. The feedback control portion may be described as reactively adjusting (such as increasing or decreasing) the rate at which the feed stream is delivered to the hydrogen-producing region responsive to the rate at which the produced hydrogen gas is consumed by the fuel cell stack, such as to produce the electrical output of the fuel cell stack.

The feed-forward portion estimates the quantity and/or flow rate of hydrogen gas required by the fuel cell stack to satisfy a portion of the applied load being applied to it. This estimate may be expressed as an estimated flow rate of feedstock(s) to the hydrogen-producing region to produce the desired quantity, or flow rate, of hydrogen gas. This estimate includes determining the amount, or portion, of the load that is not being satisfied by the fuel cell stack producing an electrical output from hydrogen gas that is presently being produced by the hydrogen generation assembly, or the hydrogen-producing region thereof. This determined portion may correlate with the portion of the demand, or applied load, that is being supplied by an energy-storage (and/or energy-producing) assembly, such as energy-storage assembly 75.

Accordingly, in some embodiments the feed-forward feed rate may be selected based at least in part upon the fuel cell stack's electrical output and in part upon the portion of the applied load that is being satisfied by an energy source other than the fuel cell stack, such as by energy-storage assembly (and/or energy-producing assembly). Using proportionality constants to scale the determined feed-forward rate, the following algorithm may be used to determine the feed-forward feed rate of feedstock to the hydrogen-producing region. The algorithm may be configured for use with a particular (or particular type of) energy-storage assembly via $K_1$ and a particular (or particular type, size, construction, etc. of) fuel cell stack via $K_2$. This portion of the control mechanism and/or method is used in a "feed forward" arrangement such that the feed rate responds to changes in the applied load. The feed-forward feed rate may be expressed as $$\text{FeedRate} = K_1 * (\text{Electrical\_Output\_from\_Energy\_Storage\_Assembly}) + K_2 * (\text{Electrical\_Output\_from\_Fuel\_Cell\_Stack})$$

The feed-forward feed rate may be expressed as a percentage or fraction of the maximum, or full-power, rate at which the feedstock delivery system is adapted to deliver feedstock to the hydrogen-producing region. In such an expression, the FeedRate identified above may be appropriately scaled based on the maximum feed rate for which the feedstock delivery system is designed to provide feedstock, or a feed stream, to the hydrogen-producing region.

The estimating step may (but is not required to in all embodiments) further include predicting the future demand for hydrogen gas. This predicting step, when utilized, may increase or decrease the feed rate that otherwise would be selected by the feed-forward portion based on any suitable stored or measured parameter that indicates a greater or lesser amount of hydrogen gas may be needed in the near future to satisfy the applied load with the electrical output of the fuel cell stack. Illustrative, non-exclusive examples of such parameters may include historical usage and/or demand data, temperature measurements (internal and/or external the fuel cell system), time and/or date measurements, measurements associated with the state of charge of any associated energy-storage device, measurements associated with another power source that is also adapted to supply an electrical output to satisfy at least a portion of the applied load for the energy-consuming device, etc.

Responsive to this estimate, the feed-forward portion of the control system determines, or selects, a feed rate for the feedstock to be delivered to the hydrogen-producing region of the hydrogen generation assembly, such as by the feedstock delivery system. Via a suitable command signal, such as to a pump or other suitable portion of the feedstock delivery system, the control system may actuate the delivery of the feedstock to the hydrogen-producing region at the determined, or selected, feed rate. For example, this determined feed rate may be selected to reduce, or eliminate, the present need for the energy storage assembly to satisfy a portion of the applied load.

An illustrative, non-exclusive mechanism, or method, for determining the feed-forward feed rate is to compare a selected, or desired, output voltage for the electrical output of the fuel cell stack to an instantaneous measurement of the true output voltage of the electrical output of the fuel cell stack, and to increase or decrease the flow rate of feedstock accordingly. As an illustrative example, this may be accomplished with any suitable sensor or detector that is in communication with the controller. The mechanism (and/or method) may further include consideration of the fuel cell stack's electrical current and knowledge of the impedance of the battery or other energy-storage assembly in the fuel cell system. Accordingly, in some embodiments the feed-forward feed rate may be selected based at least in part upon the fuel cell stack's electrical current and the impedance of the battery or other energy-storage assembly of the fuel cell system. In applications, proportionality constants may be used to scale the determined feed-forward rate. For example, the following algorithm may be used to determine the feed-forward feed rate of feedstock to the hydrogen-producing region. The algorithm is configured for use with a particular (or particular type of) energy-storage assembly via $K_1$ and a particular (or particular type, size, construction, etc. of) fuel cell stack via $K_2$. This portion of the control mechanism and/or method is used in a "feed forward" arrangement such that the feed rate responds to changes in the applied load. The feed-forward feed rate may be expressed as $$FeedRate = K_1 * \left( \frac{V_{Set\_Point} - V_{Measured}}{Z_{Battery}} \right) + K_2 * I_{FuelCellStack}$$

As discussed, the feed-forward feed rate may be expressed as a percentage or fraction of the maximum, or full-power, rate at which the feedstock delivery system is adapted to deliver feedstock to the hydrogen-producing region. As also discussed above, in such an expression, the FeedRate identified above may be appropriately scaled based on the maximum feed rate for which the feedstock delivery system is designed to provide feedstock, or a feed stream, to the hydrogen-producing region.

The feedback portion of the control system (and associated methods of controlling the delivery of feedstock) is adapted to adjust, or "trim," the feed rate determined by the feed-forward portion over time to selectively increase or decrease the consumption of feedstock by the hydrogen generation assembly. The feedback portion may programmed, or configured, to adjust (i.e., increase or decrease) the feed rate determined by the feed-forward portion within predetermined incremental amounts, or ranges. As an illustrative, non-exclusive example, the feedback portion may be adapted to selectively increase or decrease the feed rate within upper and lower thresholds that are a predetermined percentage of the feed rate determined by the feed-forward portion. As an illustrative, non-exclusive example, the feedback portion may be adapted to adjust the feed rate within a predetermined percentage, or range, of the existing feed rate, such as within an illustrative range of +/−5%, +/−10%, +/−15% and/or +/−20% of the existing, or present, feed rate, such as may have been determined by the feed-forward portion. It is within the scope of the present disclosure that the feedback portion may utilize different upper and lower threshold percentage limitations and that the determined percentage limitation may be within any of the above-presented illustrative examples. For example, the feedback portion may be configured to selectively increase the feed rate within a greater range from an existing feed rate than it is configured to selectively decrease the feed rate, and vice versa. Similarly, references herein to increasing the feed rate of the (one or more) feed streams may additionally or alternatively refer to increasing the rate at which the feed stream(s) and/or feedstock(s) are delivered to the hydrogen-producing region.

The feedback portion of the control system may be programmed or otherwise configured to selectively monitor any suitable parameter or parameters that are indicative of the feedstock delivery system delivering more or less feedstock than is needed to produce the desired amount of hydrogen gas, such as the desired amount to produce a sufficient electrical output in the fuel cell stack to satisfy the applied load. As an illustrative example, the feedback portion of the control system may be adapted to measure, such as via a suitable sensor or detector that is in communication with controller 102, the pressure of the hydrogen gas produced by the hydrogen-producing region, such as the pressure of the hydrogen gas in product hydrogen stream 254. In experiments, basing the feedback portion on PI (proportional plus integral) error control of a target hydrogen delivery pressure has proven effective, although this is not required. This target, or selected, hydrogen delivery pressure may be referred to as the hydrogen set point for the fuel cell system.

Figure 2:
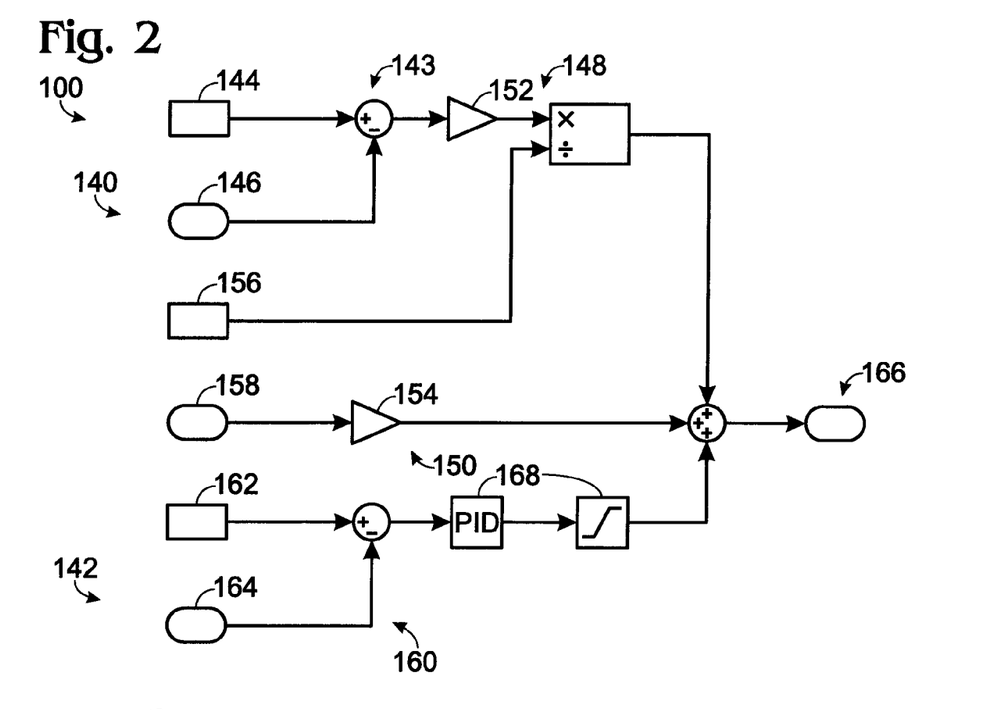
FIG. 2 is a representation of a suitable algorithm, or method, for controlling the feed rate at which at least one feedstock is delivered to the hydrogen-producing region of the hydrogen-producing fuel cell system according to the present disclosure.

An illustrative, non-exclusive diagram of a suitable feedstock control algorithm for a control system 100 is illustrated in FIG. 2. As illustrated, the feed-forward portion of the control algorithm, or associated method, is indicated at 140, and the feedback portion of the control algorithm, or associated methods, is indicated at 142. At 143, the portion of the applied load that is not being satisfied by the electrical output of the fuel cell stack with hydrogen gas that is being produced with the current feed rate is determined. As discussed, this determination may (but is not required to) include comparing the voltage of the electrical output of the fuel cell stack and the desired, or selected, voltage for this electrical output. In FIG. 2, the selected, or set point, voltage is indicated at 144, and the measured voltage is indicated at 146. As also discussed, this value may be scaled, tuned, or otherwise normalized for use in a particular fuel cell system, such as with proportionality constants and/or consideration of at least one of the current of the electrical output produced by the fuel cell stack and the impedance of the battery or other energy-storage device or energy-storage assembly that is adapted to supply at least a portion of the applied load that is not able to be satisfied by the fuel cell stack. These optional tuning steps are indicated at 148 and 150, respectively, with illustrative examples of optional proportionality constants indicated at 152 and 154, the impedance indicated at 156, and the current indicated at 158. At 160, the feedback control portion adjusts the feed rate that is estimated by the feed-forward portion. As discussed, this adjustment may be based upon a variety of factors and/or considerations, an illustrative, non-exclusive example of which is a comparison of the pressure of the product hydrogen stream and a selected, or predetermined, product hydrogen pressure. The measured hydrogen gas pressure is indicated in FIG. 2 at 162, and the selected, or set point hydrogen pressure is indicated at 164. At 166, the feed rate for the feedstock to the hydrogen-producing region is determined, or selected, based on the feed-forward and feedback portions. As discussed, this feed rate may be (but is not required to be) a percentage of the maximum feed rate that the feedstock delivery system is designed or otherwise configured to provide. Also shown in FIG. 2 are optional error-control devices, which are indicated at 168.

In some embodiments, the fuel cell system may be described as being adapted to regulate the feed rate at which the feed stream is delivered to the hydrogen-producing region, with the control system including a feed-forward control portion and a feedback control portion that cooperatively regulate the rate at which the feed stream is delivered to the hydrogen-producing region responsive at least in part to a demand for hydrogen gas by the fuel cell stack to satisfy the portion of the applied load. In such an embodiment, the feed-forward control portion may be described as being adapted, or configured, to estimate the flow rate of hydrogen gas required by the fuel cell stack to satisfy the portion of the applied load applied thereto, and the feedback control portion may be described as being adapted, or configured, to adjust the flow rate of hydrogen gas estimated by the feed-forward control portion responsive to the rate at which the hydrogen gas produced by the hydrogen generation assembly is consumed by the fuel cell stack. As discussed, in some embodiments, the estimating includes determining the portion of the applied load that is not being satisfied by the fuel cell stack using hydrogen gas produced by the hydrogen generation assembly, and in some embodiments the estimating includes a comparison of the voltage of the electrical output of the fuel cell stack to a predetermined, or set point, output voltage. The measurement of the voltage of the electrical output of the fuel cell stack may be made at any suitable location and via any suitable mechanism. As illustrative, non-exclusive examples, the voltage of the electrical output of the fuel cell stack may be measured at the fuel cell stack, such as at appropriate terminals thereof, or downstream from the stack, such as at a power management module, energy-storage device, or otherwise between the fuel cell stack and the energy-consuming assembly.

In some embodiments, the estimate additionally or alternatively includes consideration of at least one of the impedance of a battery or other energy-storage device associated with the fuel cell stack and/or the current of the electrical output of the fuel cell stack. As discussed, an energy-storage device may be associated with the fuel cell stack to satisfy at least a portion of the applied load when the fuel cell system is not able to produce a sufficient electrical output to do so. In some embodiments, the feedback control portion is adapted, or configured, to adjust (i.e., increase or decrease) the estimated flow rate by monitoring an operating parameter of the fuel cell system, such as the pressure of hydrogen gas produced by the hydrogen generation assembly (which may, but is not required to be measured as the pressure of the product hydrogen stream), that is indicative of the feedstock delivery system delivering more or less feedstock (i.e., too high or low of a feed rate of the feed stream(s) and/or feedstock(s)) than is needed to produce the required, or desired, amount of hydrogen gas.

Figure 3:
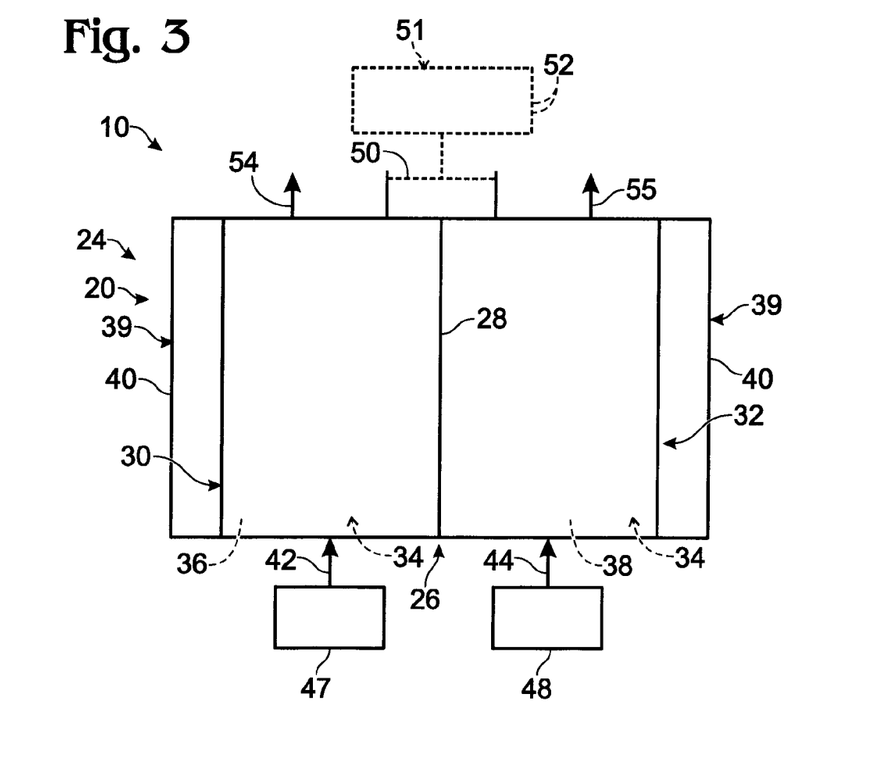
FIG. 3 is a schematic view of illustrative aspects of a fuel cell system with which the methods and load-responsive feedstock delivery systems of the present disclosure may be used.

As illustrated in FIG. 1, the fuel cell stack includes a plurality of fuel cells 20. The fuel cell stack is adapted to receive hydrogen gas 42 from a hydrogen-generation assembly, or hydrogen-producing fuel processing system, 12 and to receive an oxidant, such as air 92 from an air source 48. Fuel cell stack 24 may utilize any suitable type of fuel cell. Illustrative examples of suitable fuel cells include proton exchange membrane (PEM) fuel cells and alkaline fuel cells. Stack 24 (and system 10) may also be adapted to utilize such fuel cells as solid oxide fuel cells, phosphoric acid fuel cells, alkaline fuel cells, and molten carbonate fuel cells. For the purpose of illustration, an exemplary fuel cell 20 in the form of a PEM fuel cell is schematically illustrated in FIG. 3.

Proton exchange membrane fuel cells, which also may be referred to as solid polymer fuel cells, typically utilize a membrane-electrode assembly 26 consisting of an ion exchange, or electrolytic, membrane 28 located between an anode region 30 and a cathode region 32. Each region 30 and 32 includes an electrode 34, namely an anode 36 and a cathode 38, respectively. Each region 30 and 32 also includes a support 39, such as a supporting plate 40. Support 39 may form a portion of the bipolar plate assemblies that are discussed in more detail herein. The supporting plates 40 of fuel cells 20 carry the relative voltage potentials produced by the fuel cells.

In operation, hydrogen gas 42 from hydrogen generation assembly 12 is delivered to the anode region, and air 44 from air supply, or air source, 48 is delivered to the cathode region. Hydrogen gas 42 and oxygen gas 44 may be delivered to the respective regions of the fuel cell via any suitable mechanism from their respective sources. Hydrogen and oxygen typically combine with one another via an oxidation-reduction reaction. Although membrane 28 restricts the passage of a hydrogen molecule, it will permit a hydrogen ion (proton) to pass through it, largely due to the ionic conductivity of the membrane. The free energy of the oxidation-reduction reaction drives the proton from the hydrogen gas through the ion exchange membrane. As membrane 28 also tends not to be electrically conductive, an external circuit 50 is the lowest energy path for the remaining electron, and is schematically illustrated in FIG. 3. In cathode region 32, electrons from the external circuit and protons from the membrane combine with oxygen to produce water and heat. Thermal management systems may be adapted to selectively regulate this heat to maintain the fuel cell within a predetermined, or selected, operating temperature range, such as below a maximum threshold temperature, and/or above a minimum threshold temperature.

Air source 48 may include any suitable structure for providing a sufficient quantity of air or other suitable oxidant to the fuel cell stack and a suitable pressure for use in the stack. In some embodiments, the air source will include a blower, fan or other lower pressure source of air. In some embodiments, the air source will include a compressor or other source of higher pressure air. In some embodiments, the air source may be adapted to provide oxygen-enriched or nitrogen-depleted air to the fuel cell stack. In some embodiments, the air for the fuel cell stack is drawn from the environment proximate the fuel cell stack, and in some embodiments, no blower or other mechanical device is utilized to propel air to the cathode region of the fuel cell stack.

Also shown in FIG. 3 are an anode purge, or exhaust, stream 54, which may contain hydrogen gas, and a cathode air exhaust stream 55, which is typically at least partially, if not substantially, depleted of oxygen gas. Fuel cell stack 24 may include a common hydrogen (or other reactant) feed, air intake, and stack purge and exhaust streams, and accordingly will include suitable fluid conduits to deliver the associated streams to, and collect the streams from, the individual fuel cells. Similarly, any suitable mechanism may be used for selectively purging the regions.

In practice, fuel cell stack 24 will include a plurality of fuel cells with suitable supports, such as monopolar or bipolar plate assemblies, that separate adjacent membrane-electrode assemblies. The bipolar plate assemblies (or other supports) essentially permit the free electron to pass from the anode region of a first cell to the cathode region of the adjacent cell via the bipolar plate assembly, thereby establishing an electrical potential through the stack that may be used to satisfy an applied load. This net flow of electrons produces an electric current that may be used to satisfy an applied load, such as from at least one of an energy-consuming device 52 and the fuel cell system 10.

Illustrative, non-exclusive examples of suitable mechanisms for producing hydrogen gas from one or more feed stream 216 include steam reforming and autothermal reforming, in which reforming catalysts are used to produce hydrogen gas from a feed stream containing a carbon-containing feedstock 218 and water. Other suitable mechanisms for producing hydrogen gas include pyrolysis and catalytic partial oxidation of a carbon-containing feedstock, in which case the feed stream does not contain water. Still another suitable mechanism for producing hydrogen gas is electrolysis, in which case the feedstock is water. Examples of suitable carbon-containing feedstocks include at least one hydrocarbon or alcohol. Examples of suitable hydrocarbons include methane, propane, natural gas, diesel, kerosene, gasoline and the like. Examples of suitable alcohols include methanol, ethanol, and polyols, such as ethylene glycol and propylene glycol. It is within the scope of the present disclosure that the fuel processor may be adapted to produce hydrogen gas by utilizing more than a single mechanism.

Figure 4:
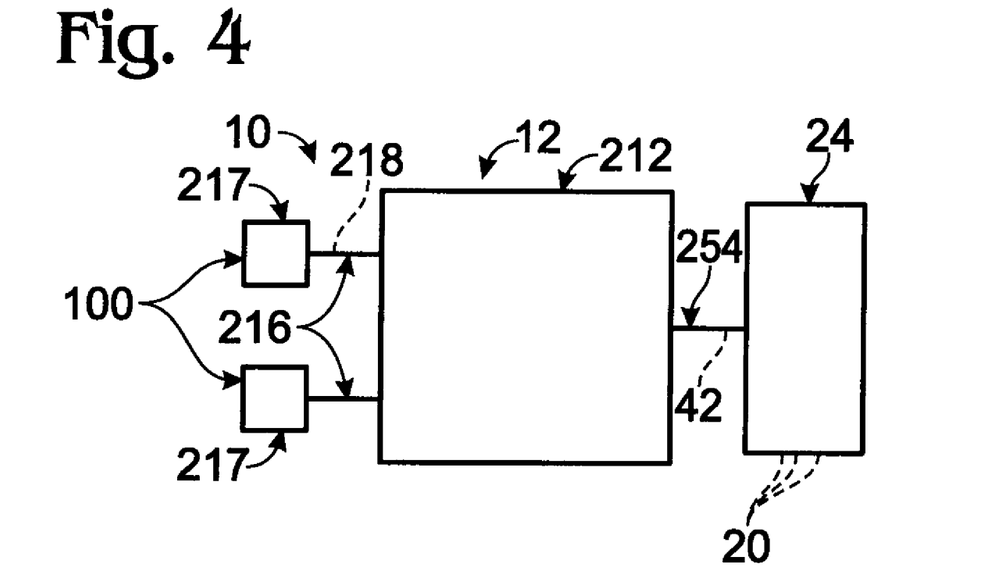
FIG. 4 is a schematic view of an illustrative hydrogen generation assembly that may be used with hydrogen-generating fuel cell systems according to the present disclosure.

Feed stream 216 may be delivered to hydrogen-producing region 212 via any suitable mechanism using control system 100. Although only a single feed stream 216 is schematically illustrated in FIG. 1, more than one stream 216 may be used and these streams may contain the same or different feedstocks. When carbon-containing feedstock 218 is miscible with water, the feedstock is typically, but not required to be, delivered with the water component of feed stream 216, such as shown in FIG. 1. When the carbon-containing feedstock is immiscible or only slightly miscible with water, these feedstocks are typically delivered to hydrogen-producing region 212 in separate streams, such as shown in FIG. 4.

In many applications, it is desirable for the hydrogen generation assembly to produce at least substantially pure hydrogen gas. Accordingly, the hydrogen generation assembly includes one or more hydrogen-producing regions that utilize a process that inherently produces sufficiently pure hydrogen gas, or the hydrogen generation assembly may include suitable purification and/or separation devices that remove impurities from the hydrogen gas produced in the hydrogen-producing region. As another example, the hydrogen generation assembly may include purification and/or separation devices downstream from the hydrogen-producing region. In the context of a fuel cell system, the hydrogen generation assembly preferably is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Illustrative, non-exclusive examples of suitable fuel processors are disclosed in U.S. Pat. Nos. 6,221,117, 5,997,594, 5,861,137, and pending U.S. Patent Application Publication Nos. 2001/0045061, 2003/0192251, and 2003/0223926. The complete disclosures of the above-identified patents and patent applications are hereby incorporated by reference for all purposes.

Figure 5:
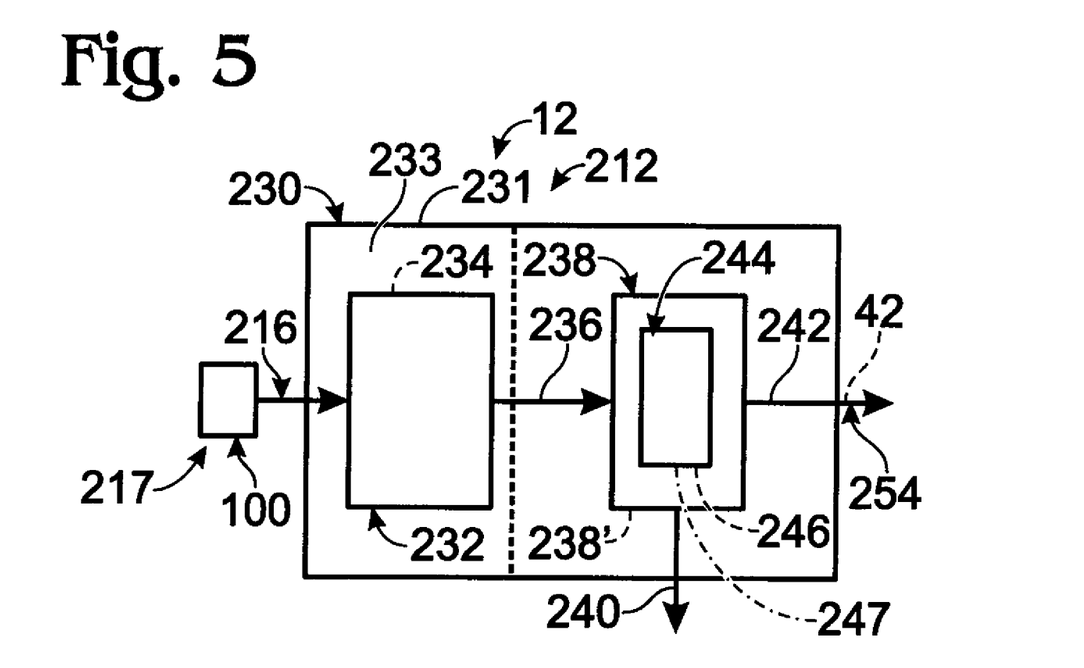
FIG. 5 is a schematic view of another illustrative hydrogen generation assembly that may be used with hydrogen-generating fuel cell systems according to the present disclosure.

For purposes of illustration, the following discussion will describe hydrogen generation assembly 212 as a steam reformer adapted to receive a feed stream 216 containing a carbon-containing feedstock 218 and water 220. However, it is within the scope of the disclosure that hydrogen generation assembly 212 may take other forms, as discussed above. An example of a suitable steam reformer is shown in FIG. 5 and indicated generally at 230. Reformer 230 includes a reforming, or hydrogen-producing, region 232 that includes a steam reforming catalyst 234. Additionally or alternatively, reformer 230 may be an autothermal reformer that includes an autothermal reforming catalyst. In reforming region 232, a reformate stream 236 is produced from the water and carbon-containing feedstock in feed stream 216. The reformate stream typically contains hydrogen gas and other gases. In the context of a hydrogen generation assembly, or fuel processor, generally, a mixed gas stream that contains hydrogen gas as its majority component is produced from the feed stream. The mixed gas stream typically includes other gases as well. Illustrative, non-exclusive examples of these other gases, or impurities, include one or more of such illustrative impurities as carbon monoxide, carbon dioxide, water, methane, and unreacted feedstock.

The mixed gas, or reformate, stream may be delivered to a separation region, or purification region, 238, where the hydrogen gas is purified. In separation region 238, the hydrogen-containing stream is separated into one or more byproduct streams, which are collectively illustrated at 240 and which typically include at least a substantial portion of the other gases, and a hydrogen-rich stream 242, which contains at least substantially pure hydrogen gas. The hydrogen-rich stream may be described as containing a greater concentration of hydrogen gas and/or a lower concentration of the other gases than the mixed gas stream. The byproduct stream may be described as containing a greater concentration of one or more of the other gases and/or a lower concentration of hydrogen gas than the mixed gas stream. The byproduct stream may, but is not required to, contain some hydrogen gas. The separation region may utilize any suitable separation process, including a pressure-driven separation process. In FIG. 5, hydrogen-rich stream 242 is shown forming product hydrogen stream 254.

An example of a suitable structure for use in separation region 238 is a membrane module 244, which contains one or more hydrogen-selective membranes 246. Examples of suitable membrane modules formed from a plurality of hydrogen-selective metal membranes are disclosed in U.S. Pat. No. 6,319,306, the complete disclosure of which is hereby incorporated by reference for all purposes. In the '306 patent, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels. Also disclosed in the above-identified application are tubular hydrogen-selective membranes, which also may be used. Other illustrative, non-exclusive examples of suitable membranes and membrane modules are disclosed in the above-incorporated patents and applications, as well as U.S. patent application Ser. Nos. 10/067,275 and 10/027,509, the complete disclosures of which are hereby incorporated by reference in their entirety for all purposes. Membrane(s) 246 may also be integrated directly into the hydrogen-producing region or other portion of hydrogen generation assembly 212.

The thin, planar, hydrogen-selective membranes may be formed from any suitable material, such as at least one of palladium and a palladium alloy. Illustrative palladium alloys include alloys of palladium with gold, silver, and/or copper, with a particular example being an alloy of palladium with 35 wt % to 45 wt % copper, such as approximately 40 wt % copper. These membranes, which also may be referred to as hydrogen-selective membranes, are typically formed from a thin foil that is approximately 0.001 inches thick. It is within the scope of the present disclosure, however, that the membranes may be formed from hydrogen-selective metals, metal alloys and/or compositions other than those discussed above, hydrogen-permeable and selective ceramics, or carbon compositions. The membranes may have thicknesses that are larger or smaller than discussed above. For example, the membrane may be made thinner, with commensurate increase in hydrogen flux. The hydrogen-permeable membranes may be arranged in any suitable configuration, such as arranged in pairs around a common permeate channel as is disclosed in the incorporated patent applications. The hydrogen-selective membrane or membranes may take other configurations as well, such as tubular configurations, which are disclosed in the incorporated patents.

Figure 6:
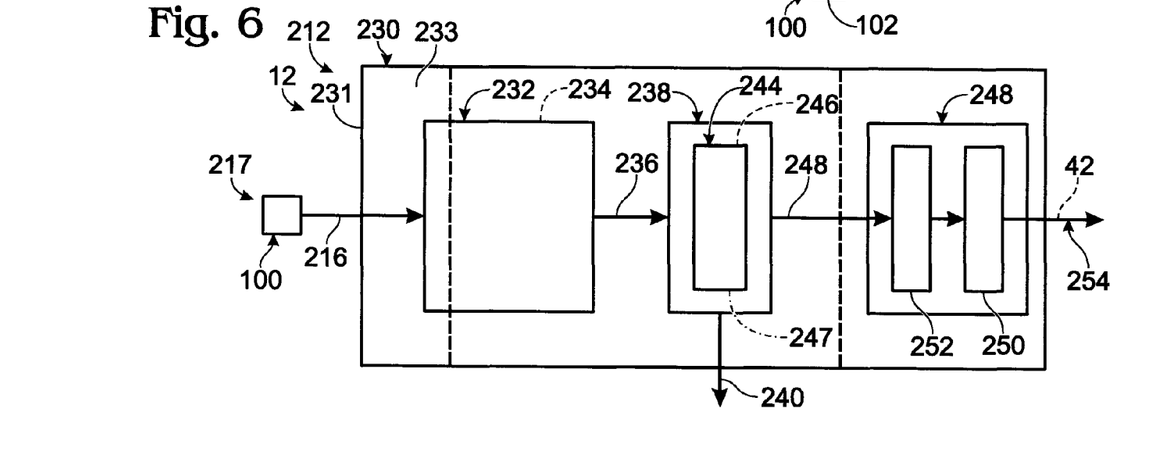
FIG. 6 is a schematic view of another illustrative hydrogen generation assembly that may be used with hydrogen-generating fuel cell systems according to the present disclosure.

Another example of a suitable pressure-separation process for use in separation region 238 is pressure swing adsorption (PSA), with a pressure swing adsorption assembly being indicated in dash-lot lines at 247 in FIGS. 5 and 6. In a PSA process, gaseous impurities are removed from a stream containing hydrogen gas. PSA is based on the principle that certain gases, under the proper conditions of temperature and pressure, will be adsorbed onto an adsorbent material more strongly than other gases. Typically, it is the impurities that are adsorbed and thus removed from reformate stream 236. The success of using PSA for hydrogen purification is due to the relatively strong adsorption of common impurity gases (such as CO, $CO_2$, hydrocarbons including $CH_4$, and $N_2$) on the adsorbent material. Hydrogen adsorbs only very weakly and so hydrogen passes through the adsorbent bed while the impurities are retained on the adsorbent material. Impurity gases, such as $NH_3$, $H_2S$, and $H_2O$, adsorb very strongly on the adsorbent material and are therefore removed from stream 236 along with other impurities. If the adsorbent material is going to be regenerated and these impurities are present in stream 236, separation region 238 preferably includes a suitable device that is adapted to remove these impurities prior to delivery of stream 236 to the adsorbent material because it is more difficult to desorb these impurities.

Adsorption of impurity gases occurs at elevated pressure. When the pressure is reduced, the impurities are desorbed from the adsorbent material, thus regenerating the adsorbent material. Typically, PSA is a cyclic process and requires at least two beds for continuous (as opposed to batch) operation. Examples of suitable adsorbent materials that may be used in adsorbent beds are activated carbon and zeolites, especially 5 Å (5 angstrom) zeolites. The adsorbent material is commonly in the form of pellets and it is placed in a cylindrical pressure vessel utilizing a conventional packed-bed configuration. It should be understood, however, that other suitable adsorbent material compositions, forms and configurations may be used.

As discussed, it is also within the scope of the disclosure that at least some of the purification of the hydrogen gas is performed intermediate the hydrogen generation assembly and the fuel cell stack. Such a construction is schematically illustrated in dashed lines in FIG. 5, in which the separation region 238' is depicted downstream from the shell 231 of hydrogen generation assembly 212.

Reformer 230 may, but does not necessarily, additionally or alternatively, include a polishing region 248, such as shown in FIG. 6. As shown, polishing region 248 receives hydrogen-rich stream 242 from separation region 238 and further purifies the stream by reducing the concentration of, or removing, selected compositions therein. When a polishing region is used without a separation region, the polishing region may receive the mixed gas stream. As a further variation, the polishing region may receive the mixed gas stream, and a separation region may receive the output stream from the polishing region.

As an illustrative, non-exclusive example, when stream 242 is intended for use in a fuel cell stack, such as stack 24, compositions that may damage the fuel cell stack, such as carbon monoxide and carbon dioxide, may be removed from the hydrogen-rich stream. For some fuel cell stacks, it is desirable for the concentration of carbon monoxide in the product hydrogen stream to be less than 10 ppm (parts per million), less than 5 ppm, or even less than 1 ppm. The concentration of carbon dioxide may be greater than that of carbon monoxide. For example, concentrations of less than 25% carbon dioxide may be acceptable for some fuel cell stacks. However, for some fuel cell stacks, it may be desirable for the concentration of carbon dioxide in the product hydrogen stream to be less than 10%, less than 1%, or less than 50 ppm. It should be understood that the acceptable maximum concentrations presented herein are illustrative examples, and that concentrations other than those presented herein may be used and are within the scope of the present disclosure. For example, particular users or manufacturers may require minimum or maximum concentration levels or ranges that are different than those identified herein. Similarly, when hydrogen generation assembly 212 is not used with a fuel cell stack, or when it is used with a fuel cell stack that is more tolerant of these impurities, then the product hydrogen stream may contain larger amounts of these gases.

Region 248 may include any suitable structure for removing or reducing the concentration of the selected compositions in stream 242. For example, when the product stream is intended for use in a PEM fuel cell stack or other device that will be damaged if the stream contains more than determined concentrations of carbon monoxide or carbon dioxide, it may be desirable to include at least one methanation catalyst bed 250. Bed 250 converts carbon monoxide and carbon dioxide into methane and water, both of which will not damage a PEM fuel cell stack. Polishing region 248 may also include another hydrogen-producing device 252, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

Steam reformers typically operate at temperatures in the range of 200° C. and 800° C., and at pressures in the range of 50 psi and 1000 psi, although temperatures and pressures outside of these ranges are within the scope of the disclosure, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel for the heating assembly may be provided by the fuel processing system, by the fuel cell system, by an external source, or any combination thereof.

In FIGS. 5 and 6, reformer 230 is shown including a shell 231 in which the above-described components are contained. Shell 231, which also may be referred to as a housing, enables the fuel processor, such as reformer 230, to be moved as a unit. It also protects the components of the fuel processor from damage by providing a protective enclosure and reduces the heating demand of the hydrogen generation assembly because the components of the hydrogen generation assembly may be heated as a unit. Shell 231 may, but does not necessarily, include insulating material 233, such as a solid insulating material, blanket insulating material, or an air-filled cavity. It is within the scope of the disclosure, however, that the reformer may be formed without a housing or shell. When reformer 230 includes insulating material 233, the insulating material may be internal the shell, external the shell, or both. When the insulating material is external a shell containing the above-described reforming, separation and/or polishing regions, the fuel processor may further include an outer cover or jacket external the insulation.

It is further within the scope of the disclosure that one or more of the components may either extend beyond the shell or be located external at least shell 231. For example, and as schematically illustrated in FIG. 6, polishing region 248 may be external shell 231 and/or a portion of reforming region 232 may extend beyond the shell. Other examples of hydrogen generation assemblies demonstrating these configurations are illustrated in the incorporated references and discussed in more detail herein.

Although fuel processor 212, feedstock delivery system 217, fuel cell stack 24 and energy-consuming device 52 may all be formed from one or more discrete components, it is also within the scope of the disclosure that two or more of these devices may be integrated, combined or otherwise assembled within an external housing or body. For example, a hydrogen generation assembly and feedstock delivery system may be combined to provide a hydrogen-producing device with an on-board, or integrated, feedstock delivery system. Similarly, a fuel cell stack may be added to provide an energy-generating device with an integrated feedstock delivery system. Fuel cell system 10 may (but is not required to) additionally be combined with one or more energy-consuming devices 52 to provide the device with an integrated, or on-board, auxiliary power source.

Additional illustrative, non-exclusive examples of suitable hydrogen-producing fuel cell systems, and components therefore, are disclosed in U.S. Pat. Nos. 6,319,306, 6,221,117, 5,997,594, 5,861,137, pending U.S. Patent Publication Nos. 2001/0045061, 2003/0192251, and 2003/0223926, and pending U.S. patent application Ser. Nos. 11/263,726, 11/404,721, and 11/229,365. The complete disclosures of the above-identified patents and patent applications are hereby incorporated by reference.

INDUSTRIAL APPLICABILITY

The hydrogen-producing fuel cell systems disclosed herein are applicable to the energy-production industries, and more particularly to the fuel cell industries.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A method for controlling the flow rate of feedstock delivered to a hydrogen-producing region of a hydrogen-producing fuel cell system containing a hydrogen generation assembly with the hydrogen-producing region that produces hydrogen gas from at least one feedstock, a feedstock delivery system that delivers a feed stream containing the at least one feedstock to the hydrogen-generation assembly, and a fuel cell stack that receives hydrogen gas produced by the hydrogen-generation assembly and produces an electrical output therefrom to satisfy at least a portion of an applied load, the method comprising:

regulating, with a control system having a feed-forward control portion and a feedback control portion, the flow rate of feedstock to the hydrogen-producing region of the hydrogen generation assembly responsive at least in part to a demand for hydrogen gas by the fuel cell stack to satisfy the portion of the applied load, wherein the regulating includes cooperatively:

estimating, by the feed-forward control portion, the flow rate of hydrogen gas required by the fuel cell stack to produce an electrical output to satisfy the applied load that is applied to the fuel cell stack, wherein the estimating is based at least in part upon determining a portion of the applied load that is not being satisfied by the fuel cell stack using hydrogen gas produced by the hydrogen generation assembly; and adjusting, by the feedback control portion, the estimated flow rate of hydrogen gas responsive to the rate at which the hydrogen gas produced by the hydrogen generation assembly is consumed by the fuel cell stack.

2. The method of claim 1, wherein the estimating further includes predicting a future demand for hydrogen gas by the fuel cell stack and adjusting the estimated flow rate of hydrogen gas responsive thereto.

3. The method of claim 1, wherein the estimating includes selecting a feed rate for the feed stream responsive at least in part to a comparison of the voltage of the electrical output of the fuel cell stack to a predetermined output voltage.

4. The method of claim 3, wherein the comparison includes adjusting the estimated flow rate of hydrogen gas responsive to the impedance of an energy-storage device associated with the fuel cell system.

5. The method of claim 3, wherein the comparison includes adjusting the estimated flow rate of hydrogen gas responsive to the current of the electrical output of the fuel cell stack.

6. The method of claim 1, wherein the method includes monitoring and selectively regulating the flow rate at which the feedstock is delivered to the hydrogen-producing region responsive at least in part to the load applied to the fuel cell system by an energy-consuming assembly.

7. The method of claim 1, wherein the adjusting includes monitoring an operating parameter of the fuel cell system that is indicative of the feedstock delivery system delivering more or less feedstock than is needed to produce the required amount of hydrogen gas.

8. The method of claim 7, wherein the operating parameter is the pressure of the hydrogen gas produced by the hydrogen-producing region.

9. The method of claim 3, wherein the adjusting includes adjusting the feed rate estimated by the feed-forward control portion in predetermined incremental amounts.

10. The method of claim 3, wherein the adjusting includes adjusting the feed rate estimated by the feed-forward control portion in predetermined percentages of the feed rate.

* * * * *